(12) United States Patent
Suzuki et al.

(10) Patent No.: US 11,794,263 B2
(45) Date of Patent: Oct. 24, 2023

(54) POWER SOURCE DEVICE FOR ELECTRIC DISCHARGE MACHINE

(71) Applicant: MAKINO MILLING MACHINE CO., LTD., Tokyo (JP)

(72) Inventors: Masato Suzuki, Kanagawa (JP); Naoto Yokoyama, Kanagawa (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 287 days.

(21) Appl. No.: 17/290,481

(22) PCT Filed: Oct. 31, 2018

(86) PCT No.: PCT/JP2018/040624
§ 371 (c)(1),
(2) Date: Apr. 30, 2021

(87) PCT Pub. No.: WO2020/090073
PCT Pub. Date: May 7, 2020

(65) Prior Publication Data
US 2021/0370425 A1 Dec. 2, 2021

(51) Int. Cl.
*B23H 1/02* (2006.01)
*B23H 1/04* (2006.01)

(52) U.S. Cl.
CPC .......... *B23H 1/022* (2013.01); *B23H 1/026* (2013.01); *B23H 1/04* (2013.01); *B23H 2300/12* (2013.01)

(58) Field of Classification Search
CPC ................................. B23H 1/02; B23H 1/022
See application file for complete search history.

(56) References Cited

U.S. PATENT DOCUMENTS 5,539,178 A * 7/1996 Taneda ................... B23H 1/022
219/69.13
5,580,469 A 12/1996 Magara
(Continued)

FOREIGN PATENT DOCUMENTS

CN 1597214 A * 3/2005
JP H7-9255 A 1/1995

OTHER PUBLICATIONS

Machine translation of CN-1579214-A, Jul. 2023.*
(Continued)

*Primary Examiner* — Geoffrey S Evans
(74) *Attorney, Agent, or Firm* — MORRISON & FOERSTER LLP

(57) ABSTRACT

A power supply device for an electric discharge machine includes a DC power supply which is connected in parallel to an electrode gap, a plurality of switching elements which are in parallel to each other and which are arranged between the electrode gap and the DC power supply, a current value acquisition unit for acquiring a value of a current, and an ON-OFF control unit which, during the time when the current value reaches a predetermined value until the time when the current starts to fall, sets a cycle for switching the plurality of switching elements from off to on to the same cycle, switches the plurality of switching elements from off to on in a predetermined order for each timing of a phase of 90°, which is 360° divided by the number of the plurality of switching elements, sets an ON-period of each of the plurality of switching elements based on a difference between the value of the current and the predetermined value, and performs ON-OFF control of the plurality of switching elements based on the cycle, the timing, and the ON-period.

4 Claims, 4 Drawing Sheets

(56) References Cited

U.S. PATENT DOCUMENTS

| | | | | |
|---|---|---|---|---|
| 5,903,067 A | * | 5/1999 | Sato | B23H 1/022 |
| | | | | 307/115 |
| 2007/0027570 A1 | * | 2/2007 | Buhler | B23H 7/02 |
| | | | | 700/162 |

OTHER PUBLICATIONS

Extended European Search Report dated Jun. 7, 2022, directed to EP Application No. 18938322.7; 8 pages.

Lin et al. (Jul. 2009). "Interleaved Four-Phase Buck-Based Current Source With Isolated Energy-Recovery Scheme for Electrical Discharge Machining," IEEE Transactions on Power Electronics 24(7): 1788-1797.

Obara et al. "Development of Twin-Type Resistorless Power Supply for Electrical Discharge Machining," 13th International Symposium for Electromachining ISEM XIII, May 9-11, 2001, Bilbao, Spain; pp. 153-160.

* cited by examiner

POWER SOURCE DEVICE FOR ELECTRIC DISCHARGE MACHINE

This application is a U.S. national stage application under 35 USC 371 of International Patent Application No. PCT/JP2018/040624, filed Oct. 31, 2018, the entire contents of which is incorporated herein by reference.

FIELD OF THE DISCLOSURE

The present invention relates to a power supply device for an electric discharge machine.

BACKGROUND OF THE DISCLOSURE

In electric discharge machines in which a workpiece is subjected to electric discharge machining (for example, die-sinking electric discharge machining), a power supply device in which a pulsed current is supplied to an electrode gap composed of a workpiece and an electrode which are opposed to each other with a predetermined gap is used. Such a power supply device for an electric discharge machine comprises a DC power supply which is connected in parallel to the electrode gap to apply a voltage for generating a current to the electrode gap, and a switching element which is arranged between the electrode gap and the DC power supply, and the electrode gap and the switching element are connected via a cable.

Conventionally, power supply devices for an electric discharge machine which reduce current ripples, which cause electrode degradation, have been proposed (for example, Patent Literature 1). Current ripples can be reduced by increasing the switching frequency of the switching element or by arranging a smoothing inductor (for example, a coil) having a high inductance value in the cable.

PATENT LITERATURE

[PTL 1] Japanese Unexamined Patent Publication (Kokai) No. 07-9255

BRIEF SUMMARY OF THE DISCLOSURE

However, when the switching frequency of a switching element is increased to reduce current ripples, since switching loss of the switching element increases as the switching frequency increases, the heat of the switching element increases, and therefore, there is a problem in that the adverse effect of heat generation is exhibited.

When a smoothing inductor having a high inductance value is arranged in the cable to reduce current ripples, the workpiece machining speed may be reduced due to the lengthening of the time from the start of current until peak current is reached.

Furthermore, when a smoothing inductor having a high inductance value is arranged in the cable in order to reduce current ripple, since the energy stored in the power supply device for an electric discharge machine increases immediately after switching the switching element from on to off, the time from the start of current fall until the current value reaches zero becomes long, whereby an abnormal arc discharge may occur.

An object of the present invention is to provide a power supply device for an electric discharge machine which can reduce current ripples without adverse effects due to the amount of heat generated, a decrease in workpiece machining speed, and abnormal arc discharge.

The power supply device for an electric discharge machine according to the preset invention is for supplying a pulsed current to an electrode gap constituted by a workpiece and an electrode, which are opposed to each other with a predetermined gap, for electric discharge machining a workpiece, and the power supply device comprises a DC power supply which is connected in parallel to the electrode gap for applying a voltage for generating the current to the electrode gap, a plurality of switching elements which are in parallel to each other and which are arranged between the electrode gap and the DC power supply, a current value acquisition unit for acquiring a value of the current, and an ON-OFF control unit which, during the time when the current value reaches a predetermined value until the time when the current starts to fall, sets a cycle for switching the plurality of switching elements from off to on to the same cycle, switches the plurality of switching elements from off to on in a predetermined order for each timing of a predetermined phase, sets an ON-period of each of the plurality of switching elements based on a difference between the value of the current and the predetermined value, and performs ON-OFF control of the plurality of switching elements based on the cycle, the timing, and the ON-period.

According to the present invention, the cycle for switching the plurality of switching elements from off to on during the period from the time when the current value reaches the predetermined value until the current starts to fall are set to be identical. Furthermore, the plurality of switching elements are switched from off to on in a predetermined order for each timing of a predetermined phase during the period from the time when the current value reaches the predetermined value until the current starts to fall. The ON-period of each of the plurality of switching elements is set based on the difference between the current value and the predetermined value during the period from the time when the current value reaches the predetermined value until the current starts to fall. Further, ON-OFF control of the plurality of switching elements is performed based on the cycle, timing, and ON-period during the period from the time when the current value reaches the predetermined value until the current starts to fall. The switching frequency when the plurality of switching elements are switched from off to on in a predetermined order for each predetermined timing of a phase in this manner is a switching frequency corresponding to the value obtained by multiplying the switching frequency of a single switching element by the number of the plurality of switching elements. Since current ripples decrease in inverse proportion to the switching frequency, the magnitude of the current ripples generated in the electrode gap by the power supply device for an electric discharge machine according to the present invention is approximately equivalent to the value obtained by dividing the magnitude of the ripples of the current that occurs in the electrode gap when a single switching element is turned on and off by the number of the plurality of switching elements. Therefore, current ripples can be reduced.

Furthermore, according to the present invention, since the heat generated by the switching loss of the switching elements is distributed among the plurality of switching elements, the influence of heat can be eliminated and the capacity of each of the plurality of switching elements can be improved.

Further, according to the present invention, since there is no need to provide a smoothing inductor having a high inductance value to reduce current ripple, there is neither a decrease in workpiece machining speed nor an abnormal arc discharge, which occurs when a smoothing inductor having a high inductance value is provided.

Preferably, the predetermined timing of a phase is a uniform timing equal to the value obtained by dividing 360° by the number of the plurality of switching elements. As a result, variations in the magnitude of the current ripples can be reduced.

Preferably, the ON-OFF control unit reduces the ON-period when the value of the current becomes greater than a first threshold value, which is greater than the predetermined value, and increases the ON-period when the value of the current is less than a second threshold value, which is less than the predetermined value. As a result, the current value can be prevented from deviating significantly from the predetermined value corresponding to peak current, which is the target current.

Preferably, a current regeneration unit for regenerating the current is arranged between a first connection point between the electrode gap and one of the plurality of switching elements and a second connection point between the electrode gap and the DC power supply. As a result, the energy stored in the power supply device for an electric discharge machine can be reduced immediately after a switching element is switched from on to off.

DETAILED DESCRIPTION OF THE DISCLOSURE

Figure 1:
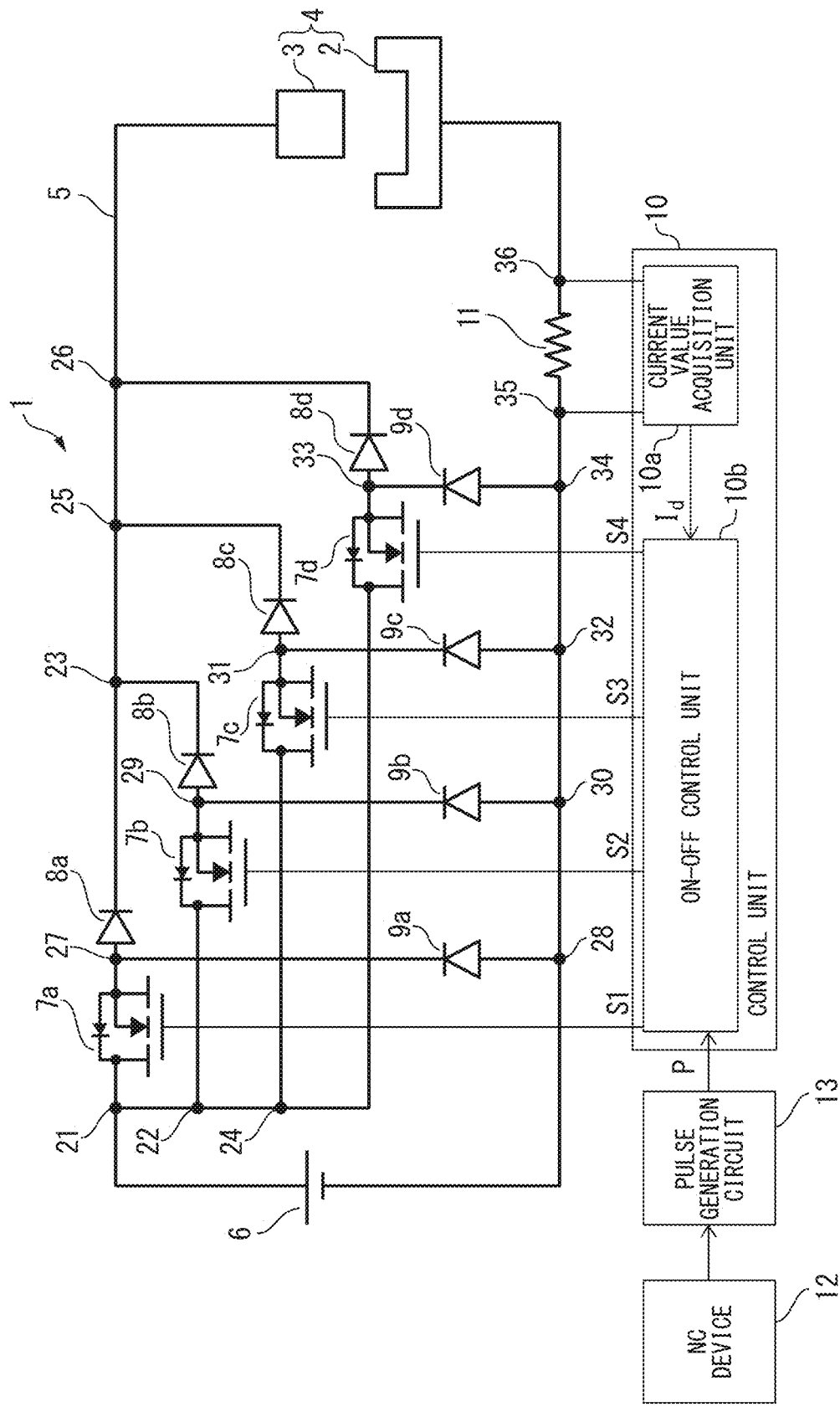
FIG. 1 is a view showing a circuit of a power supply device for an electric discharge machine according to an embodiment of the present invention.

The embodiments of the power supply device for an electric discharge machine according to the present invention will be described in detail below while referring to the drawings.

FIG. 1 is a view showing a circuit of the power supply device for an electric discharge machine according to an embodiment of the present invention. In FIG. 1, the power supply device 1 for an electric discharge machine supplies pulsed current for electric discharge machining a workpiece 2, which is immersed in an electric discharge machining liquid in a machining tank (neither illustrated), to an electrode gap 4 constituted by the workpiece 2 and an electrode 3, which are opposed to each other with a predetermined gap, via a cable 5.

The power supply device 1 for an electric discharge machine comprises a DC power supply 6, NMOS transistors 7a, 7b, 7c, 7d, diodes 8a, 8b, 8c, 8d, 9a, 9b, 9c, 9d, and a control unit 10.

The DC power supply 6 is connected in parallel to the electrode gap 4 for applying a voltage for generating current to the electrode gap 4. The pulsed voltage applied to the electrode gap 4 is, for example, 75 to 160 V, and has a frequency from approximately 1 KHz to several tens of KHz. In the present embodiment, the positive side of the DC power supply 6 is connected to the electrode 3 and the negative side of the DC power supply 6 is connected to the workpiece 2 via a shunt resistor 11.

The NMOS transistor 7a is arranged between the cable 5 and the positive side of the DC power supply 6. The NMOS transistor 7b is connected in parallel to the NMOS transistor 7a, and is arranged between the electrode 3 and the positive side of the DC power supply 6. In the present embodiment, one end of the NMOS transistor 7b is connected to a connection point 21 between the positive side of the DC power supply 6 and the NMOS transistor 7a via a connection point 22 between the connection point 21 and one end of the NMOS transistor 7b, and the other end of the NMOS transistor 7b is connected to a connection point 23 between the cable 5 and the positive side of the DC power supply 6.

The NMOS transistor 7c is connected in parallel to the NMOS transistors 7a, 7b, and is arranged between the electrode 3 and the positive side of the DC power supply 6. In the present embodiment, one end of the NMOS transistor 7c is connected to a connection point 24 between the connection point 22 and one end of the NMOS transistor 7c, and the other end of the NMOS transistor 7c is connected to a connection point 25 between the cable 5 and the connection point 23.

The NMOS transistor 7d is connected in parallel to the NMOS transistors 7a, 7b, 7c, and is arranged between the electrode 3 and the positive side of the DC power supply 6. In the present embodiment, one end of the NMOS transistor 7d is connected to the connection point 24, and the other end of the NMOS transistor 7d is connected to a connection point 26 between the cable 5 and the connection point 25.

Therefore, the NMOS transistors 7a, 7b, 7c, 7d are in parallel to each other and are arranged between the electrode 3 and the positive side of the DC power supply 6. The NMOS transistors 7a, 7b, 7c, 7d are examples of a plurality of switching elements.

The diode 8a is provided for backflow prevention, and has a cathode which is connected to the connection point 23 and an anode which is connected to the NMOS transistor 7a. The diode 8b is provided for backflow prevention, and has a cathode which is connected to the connection point 23 and an anode which is connected to the NMOS transistor 7b. The diode 8c is provided for backflow prevention, and has a cathode which is connected to the connection point 25 and an anode which is connected to the NMOS transistor 7c. The diode 8d is provided for backflow prevention, and has a cathode which is connected to a connection point 26 and an anode which is connected to the NMOS transistor 7d.

The diode 9a is provided for regenerating current immediately after the NMOS transistor 7a is switched from on to off, and is arranged between a connection point 27 between the NMOS transistor 7a and the anode of the diode 8a and a connection point 28 between the electrode gap 4 and the negative side of the DC power supply 6. The connection point 27 is an example of a first connection point and the connection point 28 is an example of a second connection point.

The diode 9b is provided for regenerating current immediately after the NMOS transistor 7b is switched from on to off, and is arranged between a connection point 29 between the NMOS transistor 7b and the anode of the diode 8b and a connection point 30 between the electrode gap 4 and the connection point 28. The connection point 29 is an example of a first connection point and the connection point 30 is an example of a second connection point.

The diode 9c is provided for regenerating current immediately after the NMOS transistor 7c is switched from on to off, and is arranged between a connection point 31 between the NMOS transistor 7c and the anode of the diode 8c and a connection point 32 between the electrode gap 4 and the connection point 30. The connection point 31 is an example of a first connection point and the connection point 32 is an example of a second connection point.

The diode 9d is provided for regenerating current immediately after the NMOS transistor 7d is switched from on to off, and is arranged between a connection point 33 between the NMOS transistor 7d and the anode of the diode 8d and a connection point 34 between the electrode gap 4 and the connection point 32. The connection point 33 is an example of a first connection point and the connection point 34 is an example of a second connection point.

The diodes 9a, 9b, 9c, 9d are examples of current regeneration units.

The control unit 10 is constituted by, for example, a field-programmable gate array (FPGA), and comprises a current value acquisition unit 10a and an ON-OFF control unit 10b.

The current value acquisition unit 10a is connected to a connection point 35 between the connection point 34 and one end of the shunt resistor 11 and a connection point 36 between the other end of the shunt resistor 11 and the workpiece 2, and has a current-sense amplifier (not illustrated) which amplifies and outputs voltage at both ends of the shunt resistor 11 corresponding to the value of the current flowing through the electrode gap 4.

Furthermore, the current value acquisition unit 10a acquires the value of the current flowing through the electrode gap 4 by converting the value of the voltage output from the current-sense amplifier to a current value based on a table, which represents the relationship between voltage and current, stored in a storage unit (not illustrated) of the control unit 10. Further, the current value acquisition unit 10a provides data of the acquired current value $I_d$ to the ON-OFF control unit 10b.

In addition to the table which represents the relationship between voltage and current, data on a target current $I_t$, a target upper limit, and a target lower limit, which will be described later, as well as a control computer program are stored in the storage unit of the control unit 10.

The ON-OFF control unit 10b receives as input a pulse signal P which is generated by a pulse generation circuit 13 based on pulse generation conditions corresponding to the machining conditions settings of the workpiece 2 set in an NC device 12 automatically or by an operator. The machining conditions settings for the workpiece 2 are determined in accordance with the material of the workpiece 2, the material of the electrode 3, the machining shape of the workpiece 2, etc. The pulse generation conditions include a pulse wave on/off time, the number of pulses of the pulse wave, a pulse pause time, etc.

Further, the ON-OFF control unit 10b generates a pulse signal S1 for turning on or off the NMOS transistor 7a, a pulse signal S2 for turning on or off the NMOS transistor 7b, a pulse signal S3 for turning on or off the NMOS transistor 7c, and a pulse signal S4 for turning on or off the NMOS transistor 7d based on the data of the current value $I_d$ and the pulse signal P.

In the present embodiment, the ON-OFF control unit 10b sets the switching cycles at which the NMOS transistors 7a, 7b, 7c, 7d are turned from off to on to the same cycle T during the time when the current value $I_d$ reaches a target current $I_t$ corresponding to a peak current until the current starts to fall. The target current $I_t$ is an example of the predetermined value.

Furthermore, the ON-OFF control unit 10b switches the NMOS transistor 7a, the NMOS transistor 7b, and the NMOS transistors 7c and 7d from off to on in this order for each timing of a phase of 90° corresponding to ¼ of the switching cycle during the time when the current value $I_d$ reaches the target current $I_t$ until the current starts to fall. In other words, the ON-OFF control unit 10b switches the NMOS transistors 7a, 7b, 7c, 7d from off to on in this order for each timing of a phase of 90° during the time when the current value $I_d$ reaches the target current $I_t$ until the current starts to fall.

The timing of a phase of 90° is an example of a timing of a phase of a value obtained by dividing 360° by the number of the plurality of switching elements. The phase timings need not be uniform in this manner, may be predetermined, may be 360° in one cycle, and may be, for example, 80°, 100°, 80° and 100°. Furthermore, the ON-OFF control unit 10b determines the switching cycle of each of the NMOS transistors 7a, 7b, 7c, 7d and the timing at which the switching cycle of each of the NMOS transistors 7a, 7b, 7c, 7d rises based on a clock (not illustrated) of the control unit 10. The timing at which the switching cycle of each of the NMOS transistors 7a, 7b, 7c, 7d rises corresponds to the timing at which each of the NMOS transistors 7a, 7b, 7c, 7d is switched from off to on.

Furthermore, the ON-OFF control unit 10b sets the ON-period of each of the NMOS transistors 7a, 7b, 7c, 7d based on the difference between the current value $I_d$ and the target current $I_t$ during the time when the current value $I_d$ reaches the target current $I_t$ until the current starts to fall.

In the present embodiment, the ON-OFF control unit 10b reduces the ON-period of the NMOS transistor that is switched from off to on among the NMOS transistors 7a, 7b, 7c, 7d when the current value $I_d$ is greater than the target upper limit, which is greater than the target current $I_t$. The target upper limit is an example of a first threshold value.

Furthermore, in the present embodiment, the ON-OFF control unit 10b increases the ON-period of NMOS transistor 7a, 7b, 7c, 7d that is switched from off to on among the NMOS transistors 7a, 7b, 7c, 7d when the current value $I_d$ is less than the target lower limit, which is less than the target current $I_t$. The target lower limit is an example of a second threshold value.

For example, if the ON-period of the NMOS transistors 7a, 7b, 7c, 7d when the current value $I_d$ is between the target upper limit and the target lower limit is $T_a$, the ON-period of the NMOS transistors 7a, 7b, 7c, 7d when the current value $I_d$ is less than the target lower limit is $T_b$, the ON-period of the NMOS transistors 7a, 7b, 7c, 7d when the current value $I_d$ is greater than the target upper limit is $T_c$, and $K_b$ is a correction coefficient, the ON-period $T_b$ is determined based on the formula:

$$T_b = T_a + (I_t - I_d) \times k_b \qquad \text{[Math 1]}$$

and the ON-period $T_c$ is determined based on the formula:

$$T_c = T_a - (I_t - I_d) \times k_c \qquad \text{[Math 2]}$$

For example, the ON-period $T_a$ is ⅛ of the switching cycle, the ON-period $T_b$ is ¼ of the switching cycle, and the ON-period $T_c$ is 1/16 of the switching cycle.

Further, the ON-OFF control unit 10b performs ON-OFF control of the NMOS transistors 7a, 7b, 7c, 7d based on the switching cycle, the timing of the phase of 90°, and the ON-period of each NMOS transistor 7a, 7b, 7c, 7d during the time when the current value $I_d$ reaches the target current $I_t$ corresponding to the peak current until the current starts to fall.

Figure 2:
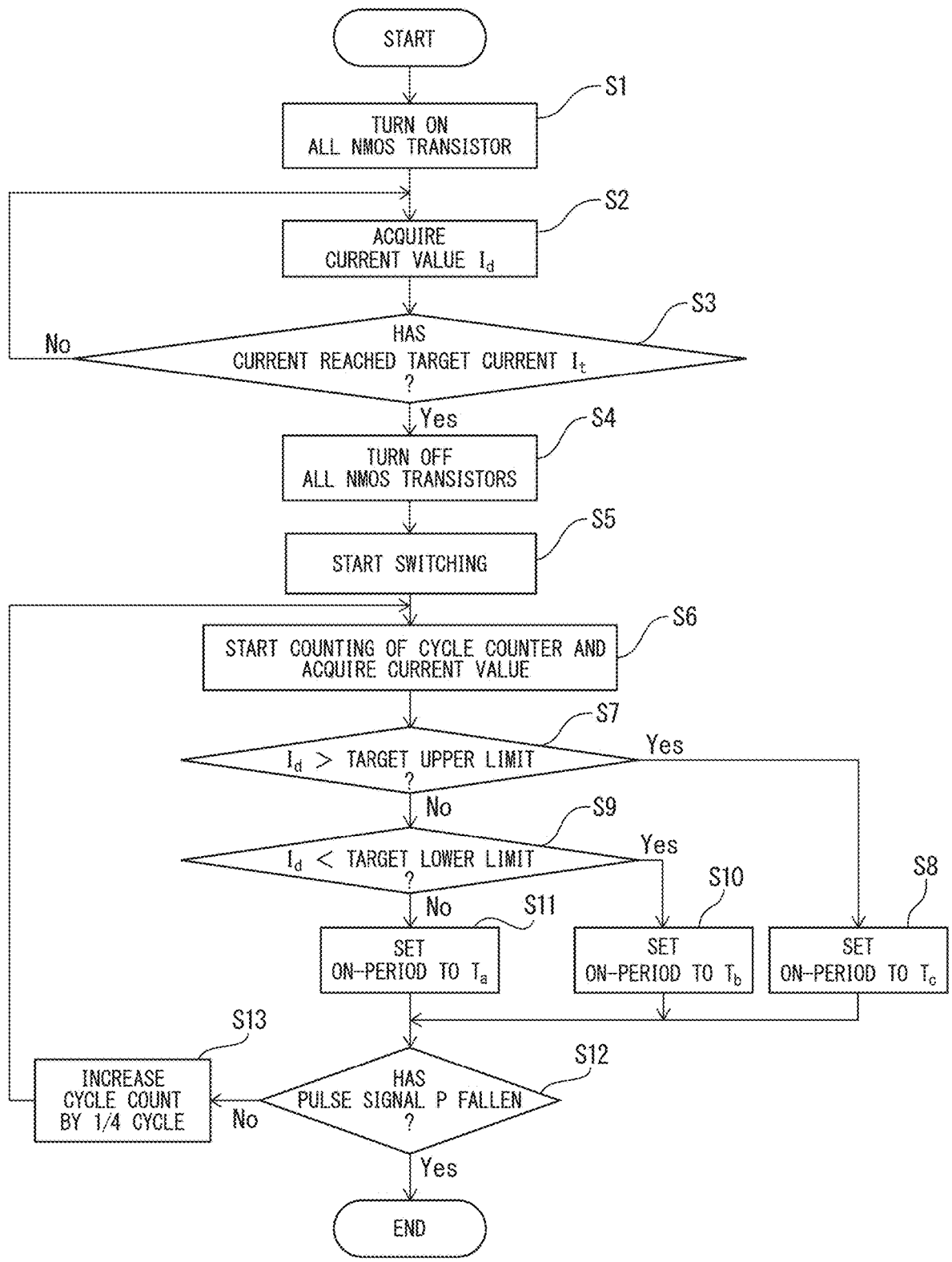
FIG. 2 is a flowchart detailing the operation of the power supply device for an electric discharge machine of FIG. 1.

FIG. 2 is a flowchart detailing the operation of the power supply device for an electric discharge machine of FIG. 1. This flow is executed every time the pulse signal P is switched from off to on, mainly by each element of the control unit 10, based on the control computer program stored in the storage unit of the control unit 10.

First, the ON-OFF control unit 10b outputs pulse signals S1, S2, S3, S4 for turning on all of the NMOS transistors 7a, 7b, 7c, 7d to the NMOS transistors 7a, 7b, 7c, 7d, respectively (step S1).

Next, the ON-OFF control unit 10b acquires the current value $I_d$ (step S2). Next, the ON-OFF control unit 10b determines whether the current value $I_d$ has reached the target current $I_t$ (step S3). When the current value $I_d$ has not reached the target current $I_t$, the process returns to step S2 (No in step S3). Conversely, when the current value $I_d$ has reached the target current $I_t$ (Yes in step S3), the ON-OFF control unit 10b outputs the pulse signals S1, S2, S3, S4 for turning off all of the NMOS transistors 7a, 7b, 7c, 7d to the NMOS transistors 7a, 7b, 7c, 7d, respectively (step S4).

Next, the ON-OFF control unit 10b starts the switching cycle of any of the NMOS transistors 7a, 7b, 7c, 7d (step S5).

The ON-OFF control unit 10b starts the counting of a cycle counter (not illustrated) corresponding to the NMOS transistor for which the switching cycle has started (for example, the NMOS transistor 7a) (step S6). Furthermore, in step S6, the current value acquisition unit 10a acquires the current value $I_d$.

Next, the ON-OFF control unit 10b determines whether the current value $I_d$ is greater than the target upper limit (step S7). When the current value $I_d$ is greater than the target upper limit (Yes in step S7), the ON-OFF control unit 10b sets the ON-period of the NMOS transistor for which the switching cycle has started to $T_c$ and outputs a corresponding pulse signal to the NMOS transistor (step S8).

Conversely, when the current value $I_d$ is not greater than the target upper limit (No in step S7), the ON-OFF control unit 10b determines whether the current value $I_d$ is less than the target lower limit (step S9). When the current value $I_d$ is less than the target lower limit (Yes in step S9), the ON-OFF control unit 10b sets the ON-period of the NMOS transistor for which the switching cycle has started to $T_b$ and outputs a corresponding pulse signal to the NMOS transistor (step S10).

Conversely, when the current value $I_d$ is not less than the target lower limit (No in step S9), the ON-OFF control unit 10b sets the ON-period of the NMOS transistor for which the switching cycle has started to $T_a$ and outputs a corresponding pulse signal to the NMOS transistor (step S11).

After step S8, step S10, or step S11, the ON-OFF control unit 10b determines whether the pulse signal P has fallen (step S12). When the pulse signal P has fallen (Yes in step S12), the control unit 10 ends the process. Conversely, when the pulse signal P has not fallen (No in step S12), the ON-OFF control unit 10b increases the count of the cycle counter corresponding to the NMOS transistor for which switching cycle has started by ¼ cycle (step S13), and the process returns to step S6.

As used herein, the ON-period $T_b$ of the NMOS transistors 7a, 7b, 7c, 7d refers to the ON-period until the current value $I_d$ becomes less than the target lower limit and then reaches the target current $I_t$, and the ON-period $T_c$ refers to the ON-period until the current value $I_d$ reaches the target current $I_t$ after the current value $I_d$ has become greater than the target upper limit.

Figure 3:
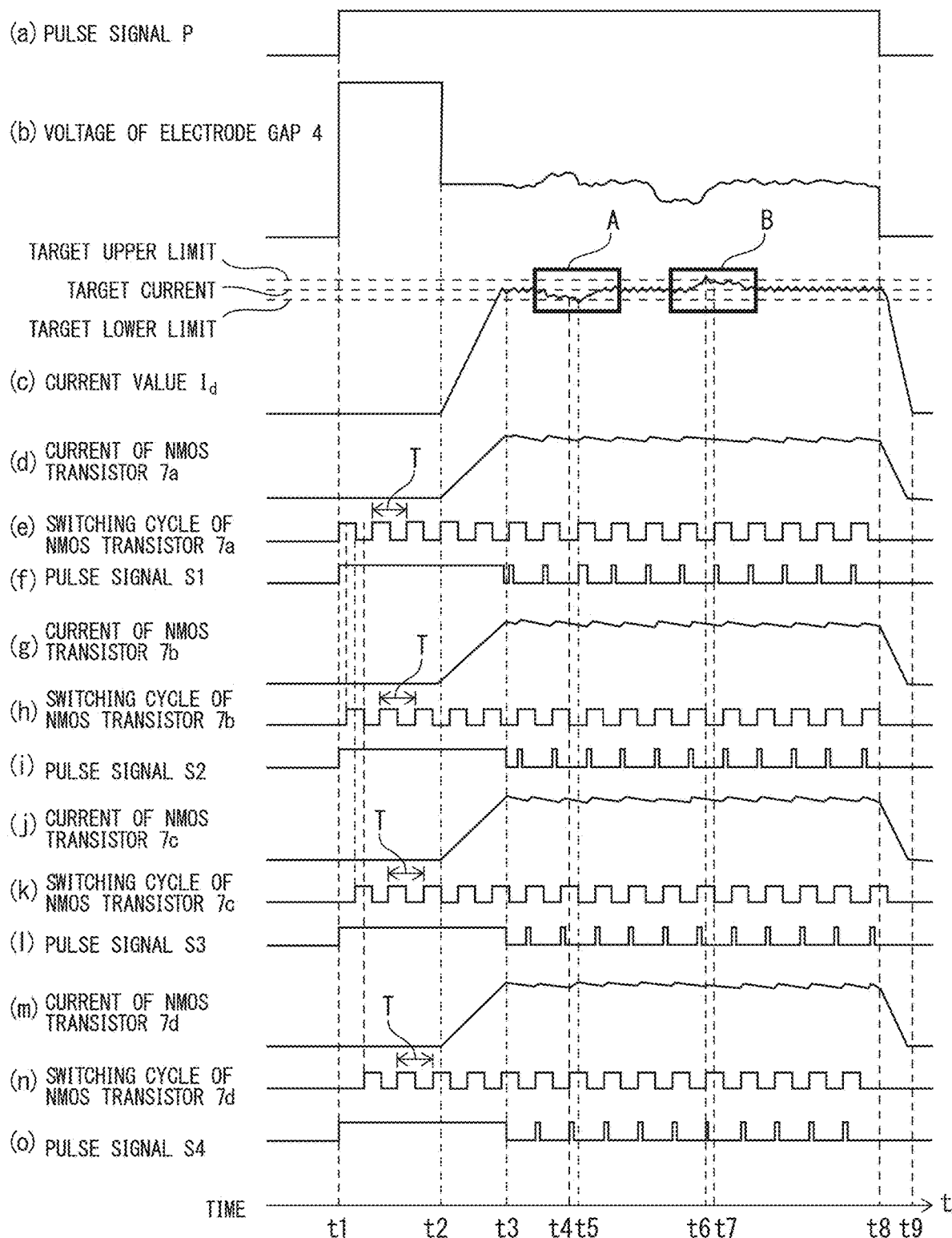
FIG. 3 is a timing chart detailing the operation of the power supply device for an electric discharge machine of FIG. 1
Figure 4:
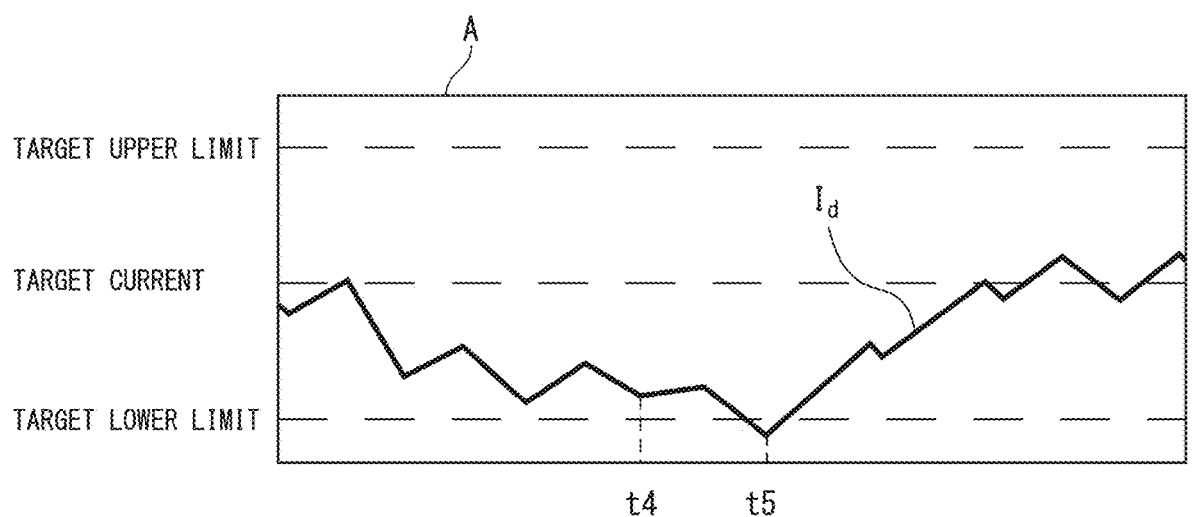
FIG. 4 is an enlarged view of portion A of the timing chart of FIG. 3.
Figure 5:
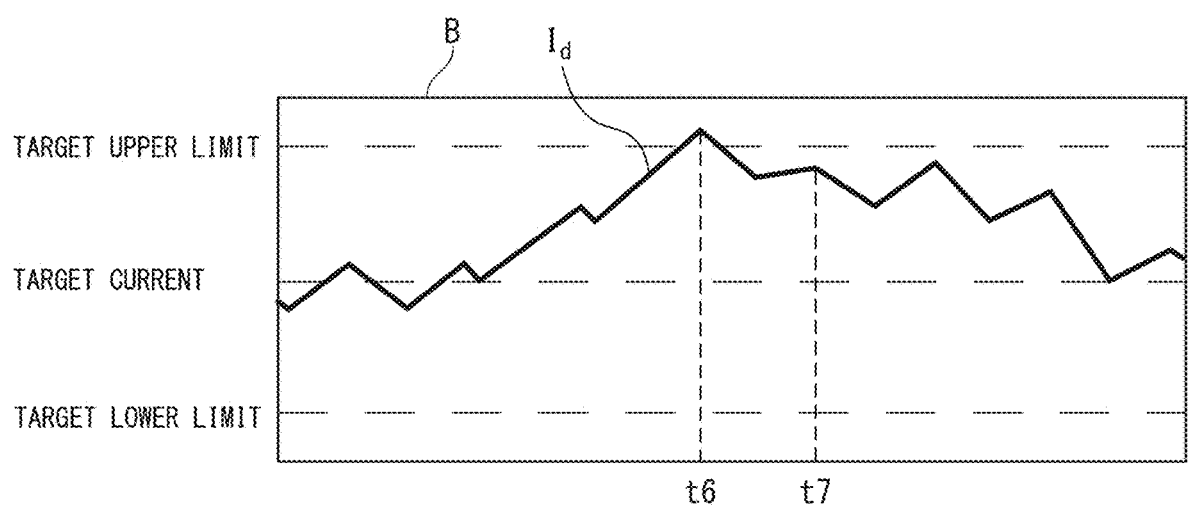
FIG. 5 is an enlarged view of portion B of the timing chart of FIG. 3.

FIG. 3 is a timing chart detailing the operation of the power supply device for an electric discharge machine of FIG. 1, FIG. 4 is an enlarged view of portion A of the timing chart of FIG. 3, and FIG. 5 is an enlarged view of portion B of the timing chart of FIG. 3.

In the timing chart of FIG. 3, one cycle of a plurality of rising and falling cycles of the pulse signal P supplied to the ON-OFF control unit 10b for machining the workpiece 2 will be described.

Furthermore, in the timing chart of FIG. 3, the cases in which the current value $I_d$ becomes less than the target lower limit during the period represented by portion A and the current value $I_d$ becomes greater than the target upper limit during the period represented by portion B will be described.

In FIG. 3, (a) represents the pulse signal P, (b) represents the voltage of the electrode gap 4, and (c) represents the current value $I_d$. Furthermore, in FIG. 3, (d), (e), and (f) represent the current flowing through the NMOS transistor 7a, the switching cycle of the NMOS transistor 7a, and the pulse signal S1, respectively. Furthermore, in FIG. 3, (g), (h), and (i) represent the current flowing through the NMOS transistor 7b, the switching cycle of the NMOS transistor 7b, and the pulse signal S2, respectively. Furthermore, in FIG. 3, (j), (k), and (l) represent the current flowing through the NMOS transistor 7c, the switching cycle of the NMOS transistor 7c, and the pulse signal S3, respectively. Furthermore, in FIG. 3, (m), (n), and (o) represent the current flowing through the NMOS transistor 7d, the switching cycle of the NMOS transistor 7d, and the pulse signal S4, respectively.

In the timing chart of FIG. 3, the current value acquisition unit 10a acquires the current value $I_d$ each time a rise of any of the switching cycles of the NMOS transistors 7a, 7b, 7c, 7d is detected.

When the pulse signal P rises at time t1, all of the NMOS transistors 7a, 7b, 7c, 7d are switched from off to on and voltage Vs1 is applied to the electrode gap 4 by the DC power supply 6. The operation for switching all of the NMOS transistors 7a, 7b, 7c, 7d, from off to on at time t1 corresponds to the process of step S1 of FIG. 2.

When dielectric breakdown occurs in the electrode gap 4 at time t2 and the current value $I_d$ reaches the target current at time t3 due to the dielectric breakdown, all of the NMOS transistors 7a, 7b, 7c, 7d are switched from on to off. The operation for switching all of the NMOS transistors 7a, 7b, 7c, 7d from on to off at time t3 corresponds to the process of step S4 of FIG. 2. Furthermore, the operation in which the current value acquisition unit 10a acquires the current value $I_d$ each time a rise of any of the switching cycles of the NMOS transistors 7a, 7b, 7c, 7d is detected corresponds to the process of step S2 in FIG. 2.

When the current value $I_d$ is greater than the target lower limit at time t4 when the waveform of the switching cycle of the NMOS transistor 7d rises, the ON-period of the NMOS transistor 7d is $T_a$. When the current value $I_d$ is less than the target lower limit at time t5 when the waveform of the switching cycle of the NMOS transistor 7a rises, the ON-period of the NMOS transistor 7a is $T_b$. The operation of setting the ON-period of the NMOS transistor 7a to $T_b$ at time t5 corresponds to the process of Yes in step S9 and the process of step S10.

When the current value $I_d$ is greater than the target upper limit at time t6 when the waveform of the switching cycle of the NMOS transistor 7d rises, the ON-period of the NMOS transistor 7d is $T_c$. The operation of setting the ON-period of the NMOS transistor 7d to $T_c$ at time t6 corresponds to the process of Yes in step S7 and the process of step S8. When the current value $I_d$ becomes less than the target upper limit and falls between the target upper limit and the target current $I_t$ at time t7 when the waveform of the switching cycle of the NMOS transistor 7a rises, the ON-period of the NMOS transistor 7a is $T_a$.

When the pulse signal P falls at time t8, the current value $I_d$ falls and becomes zero at time t9. This process corresponds to the process of Yes in step S12. Furthermore, each time the waveform of the switching cycle of any of the NMOS transistors 7a, 7b, 7c, 7d rises in the period from time t3 to time t4, the period from time t5+T/4 to time t6, and the period from time t7+T/4 to time t8, the ON-period of any of the NMOS transistors 7a, 7b, 7c, 7d is set to $T_a$. This process corresponds to the process of No in step S7, the process of No in step S9, and the process of step S11.

The switching frequency when the NMOS transistors 7a, 7b, 7c, 7d are switched from off to on in a predetermined order for each 90° phase timing, as in the present embodiment, is a switching frequency which is four times the switching frequency of a single NMOS transistor. Since current ripples decrease in inverse proportion to the switching frequency, the magnitude of the current ripples generated in the electrode gap 4 is a magnitude corresponding to ¼ of the magnitude of the current ripples generated in the electrode gap 4 when a single NMOS transistor is turned on and off. Therefore, current ripples can be reduced.

Furthermore, according to the present embodiment, since the heat generated by the switching loss of the NMOS transistors 7a, 7b, 7c, 7d is distributed among the NMOS transistors 7a, 7b, 7c, 7d, the effect of heat generation is eliminated, and the capability of each of the plurality of switching elements can be improved.

Furthermore, according to the present embodiment, since there is no need to provide a smoothing inductor having a high inductance value to reduce current ripple, there is neither a decrease in the workpiece 2 machining speed nor abnormal arc discharge, which occurs when a smoothing inductor having a high inductance value is provided.

Furthermore, according to the present embodiment, since the ON-period of the NMOS transistors 7a, 7b, 7c, 7d is increased when the current value $I_d$ becomes less than the target lower limit and the ON-period of the NMOS transistors 7a, 7b, 7c, 7d is reduced when the current value $I_d$ becomes greater than the target upper limit, the current value $I_d$ can be prevented from deviating significantly from the target current.

Further, according to the present embodiment, by arranging diodes 9a, 9b, 9c, 9d for regenerating current, the energy stored in the power supply device 1 for an electric discharge machine immediately after the NMOS transistors 7a, 7b, 7c, 7d are switched from on to off can be reduced The present invention is not limited to the embodiments described above, and various changes and modifications can be made. For example, the number of NMOS transistors may be two, three, five, or more, and when the number of NMOS transistors is two, the two NMOS transistors 7 are switched from off to on in a predetermined order at each phase timing of 180°. Furthermore, at least one of the diodes 8a, 8b, 8c, 8d, 9a, 9b, 9c, 9d may be omitted. Further, PMOS transistors or the like may be used as the switching elements.

REFERENCE SIGNS LIST 1 power supply device for electric discharge machine
2 workpiece
3 electrode
4 electrode gap
5 cable
6 DC power supply
7a, 7b, 7c, 7d NMOS transistor
8a, 8b, 8c, 8d, 9a, 9b, 9c, 9d diode
10 control unit
10a current value acquisition unit
10b ON-OFF control unit
11 shunt resistor
12 NC device
13 pulse generation circuit
21, 22, 23, 24, 25, 26, 27, 28, 29, 30, 31, 32, 33, 34, 35, 36 connection point

The invention claimed is:

1. A power supply device for an electric discharge machine for supplying a pulsed current to an electrode gap constituted by a workpiece and an electrode, which are opposed to each other with a predetermined gap, for electric discharge machining a workpiece, the power supply device comprising:
   a DC power supply which is connected in parallel to the electrode gap for applying a voltage for generating the current to the electrode gap,
   a plurality of switching elements which are in parallel to each other and which are arranged between the electrode gap and the DC power supply,
   current value acquisition circuitry for acquiring a current value, and
   an ON-OFF controller which, during the time interval from the time when the current value reaches a predetermined value to the starting time of a fall of the current value, sets a cycle for switching the plurality of switching elements from off to on to be the same cycle, switches the plurality of switching elements from off to on in sequence for each timing of a phase of a predetermined angle, sets an ON-period of each of the plurality of switching elements based on a difference between the current value and the predetermined value, and performs ON-OFF control of the plurality of switching elements based on the cycle, the timing, and the ON-period.

2. The power supply device for an electric discharge machine according to claim 1, wherein the timing of phase of a predetermined angle is an equal timing of a phase of an angle obtained by dividing 360° by the number of the plurality of switching elements.

3. The power supply device for an electric discharge machine according to claim 1, wherein the ON-OFF controller reduces the ON-period when the current value becomes greater than a first threshold value, which is greater than the predetermined value, and increases the ON-period when the current value is less than a second threshold value, which is less than the predetermined value.

4. The power supply device for an electric discharge machine according to claim 1, wherein current regeneration circuitry for regenerating the current is arranged between a first connection point between the electrode gap and one of the plurality of switching elements and a second connection point between the electrode gap and the DC power supply.

* * * * *